United States Patent
Fukuta

(10) Patent No.: US 9,518,871 B2
(45) Date of Patent: Dec. 13, 2016

(54) METHOD OF MEASURING TEMPERATURE IN CUTTING PROCESS

(71) Applicant: Toshiba Kikai Kabushiki Kaisha, Tokyo-ku (JP)

(72) Inventor: Masahiko Fukuta, Numazu (JP)

(73) Assignee: TOSHIBA KIKAI KABUSHIKI KAISHA, Tokyo-To (JP)

(*) Notice: Subject to any disclaimer, the term of this patent is extended or adjusted under 35 U.S.C. 154(b) by 749 days.

(21) Appl. No.: 13/754,490

(22) Filed: Jan. 30, 2013

(65) Prior Publication Data

US 2013/0195143 A1   Aug. 1, 2013

(30) Foreign Application Priority Data

| Jan. 31, 2012 | (JP) | 2012-018322 |
| Apr. 2, 2012 | (JP) | 2012-084173 |
| Dec. 25, 2012 | (JP) | 2012-281471 |
| Dec. 26, 2012 | (JP) | 2012-283254 |

(51) Int. Cl.
| *G01K 7/00* | (2006.01) |
| *G01K 1/00* | (2006.01) |
| *G01K 13/00* | (2006.01) |
| *G01K 7/02* | (2006.01) |

(52) U.S. Cl.
CPC ............................. *G01K 7/02* (2013.01)

(58) Field of Classification Search
USPC .................. 374/141, 179, 180, 208
See application file for complete search history.

(56) References Cited

U.S. PATENT DOCUMENTS

| 4,676,557 | A | * | 6/1987 | Shope | B23D 59/02 |
| | | | | | 125/28 |
| 5,176,053 | A | * | 1/1993 | Alvelid | B23B 27/145 |
| | | | | | 374/141 |
| 5,451,288 | A | * | 9/1995 | Smith | B26D 7/10 |
| | | | | | 156/359 |
| 7,156,260 | B2 | * | 1/2007 | Hayduk | B29B 7/7433 |
| | | | | | 222/145.5 |

(Continued)

FOREIGN PATENT DOCUMENTS

| CN | 1805820 | 7/2006 |
| DE | 202 827 | 10/1983 |

(Continued)

OTHER PUBLICATIONS

Chinese Office Action issued in CN 201310037436.3 dated Dec. 3, 2014.

(Continued)

*Primary Examiner* — Mirellys Jagan
(74) *Attorney, Agent, or Firm* — DLA Piper LLP (US)

(57) ABSTRACT

The invention relates to a method of measuring a cutting temperature for an apparatus for a cutting process, when the apparatus for a cutting process includes a shank and a tool jointed to the shank by means of silver solder, the shank being electrically conductive, the tool being electrically nonconductive. The method includes: connecting a first lead wire to the shank, connecting a second lead wire to the silver solder, and measuring thermal electromotive force that is generated between the first lead wire and the second lead wire.

9 Claims, 3 Drawing Sheets

(56) References Cited

U.S. PATENT DOCUMENTS

| | | | | |
|---|---|---|---|---|
| 2005/0211029 A1* | 9/2005 | Zurecki | ................ | B23P 25/003 82/1.11 |
| 2009/0269151 A1 | 10/2009 | Oles | | |
| 2014/0334516 A1* | 11/2014 | Verhagen | ............... | G01N 25/18 374/44 |

FOREIGN PATENT DOCUMENTS

| | | |
|---|---|---|
| GB | 1334371 | 10/1973 |
| GB | 2 305 502 | 4/1997 |
| JP | 05-309536 | 11/1993 |
| JP | 06-126564 | 5/1994 |
| JP | 2006-102864 | 4/2006 |

OTHER PUBLICATIONS

English Language Translation for Chinese Office Action issued in CN 201310037436.3 dated Dec. 3, 2014.
English Language Translation for DD 202 827 published Oct. 5, 1983.
English Language Abstract of JP 2006-102864 published Apr. 2, 2006.
English Language Translation of JP 2006-102864 published Apr. 2, 2006.
English Language Abstract of JP 05-309536 published Nov. 22, 1993.
English Language Translation of JP 05-309536 published Nov. 22, 1993.
English Language Abstract of JP 06-126564 published May 10, 1994.
English Language Translation of JP 06-126564 published May 10, 1994.
Liu Zhanqiang et al., "Summary of Cutting Temperature Measurement Methods", China Academic Journal Electronic Publishing House, 2002.
English Language Translation for Liu Zhanqiang et al., "Summary of Cutting Temperature Measurement Methods", China Academic Journal Electronic Publishing House, 2002.
English Language Abstract & Translation of TW Office Action 102103722 issued on Feb. 2, 2016.
English Language Abstract & Translation of CN 1805820 published Jul. 19, 2006.

* cited by examiner

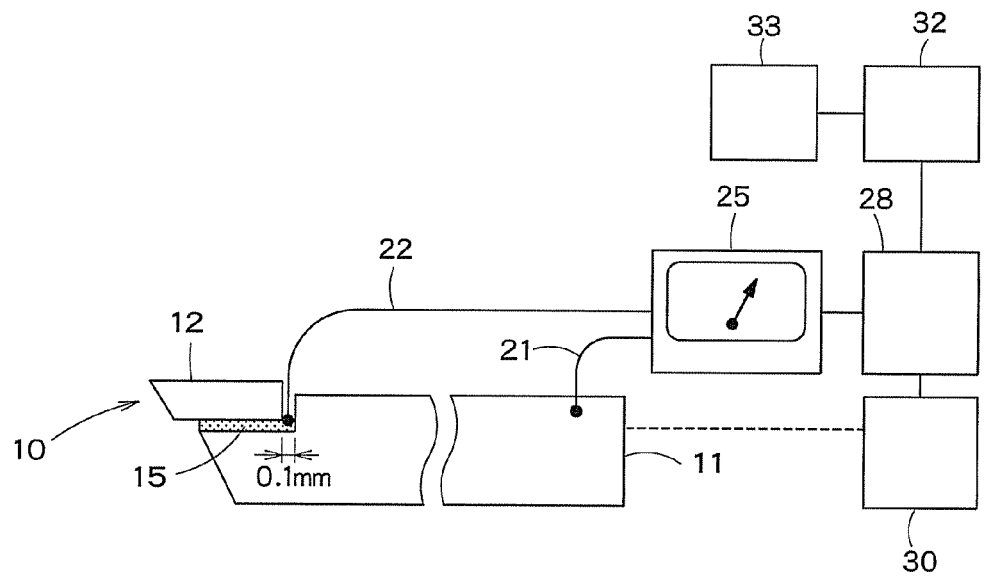
F I G. 1
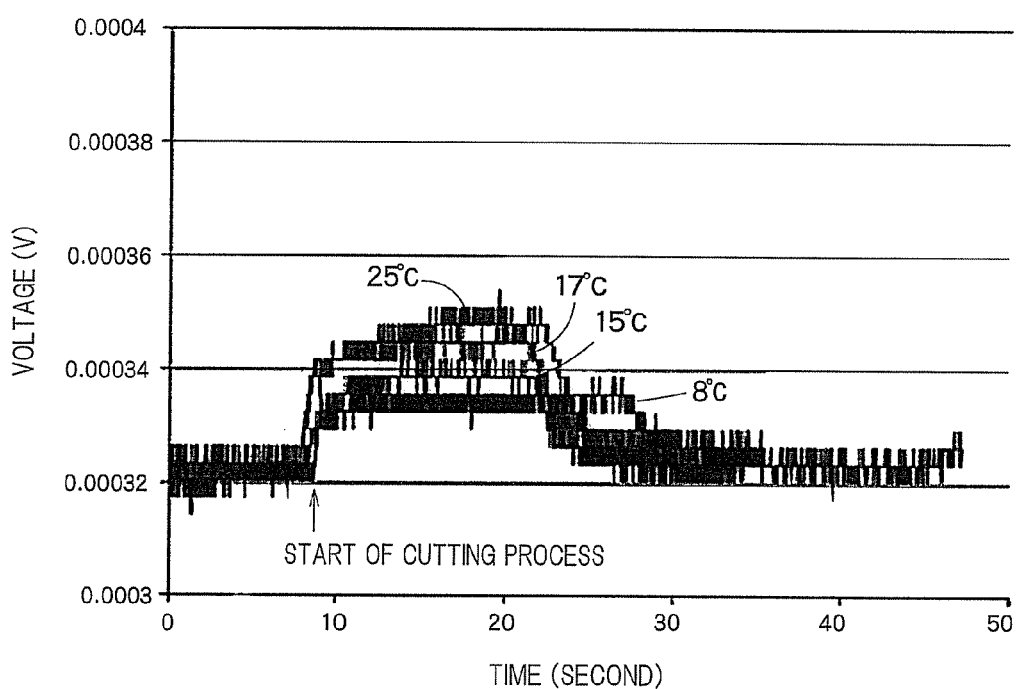
F I G. 2

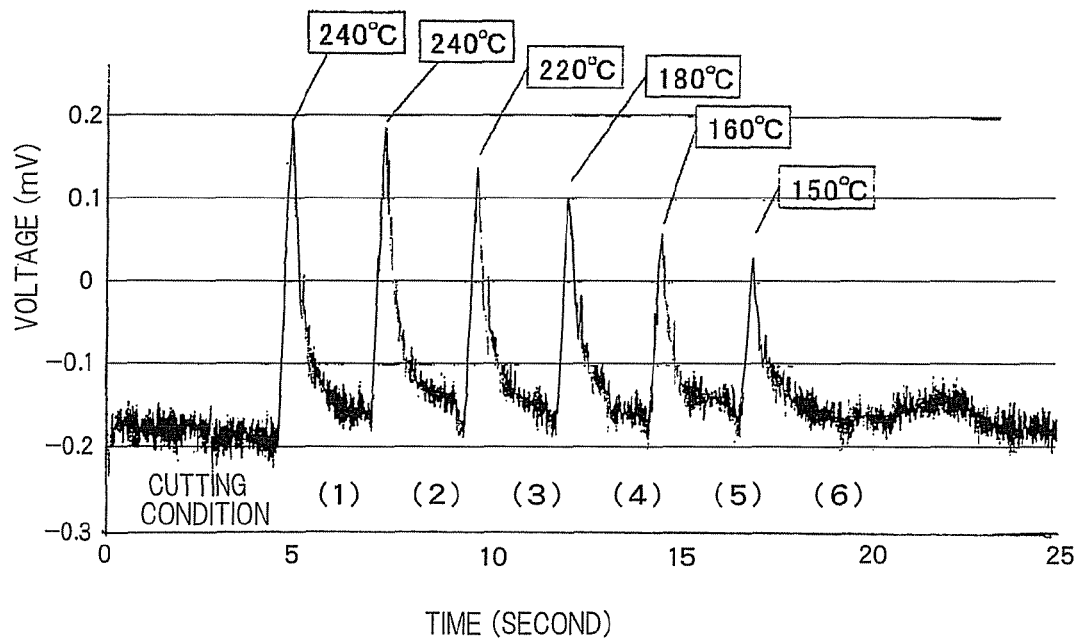
F I G. 3
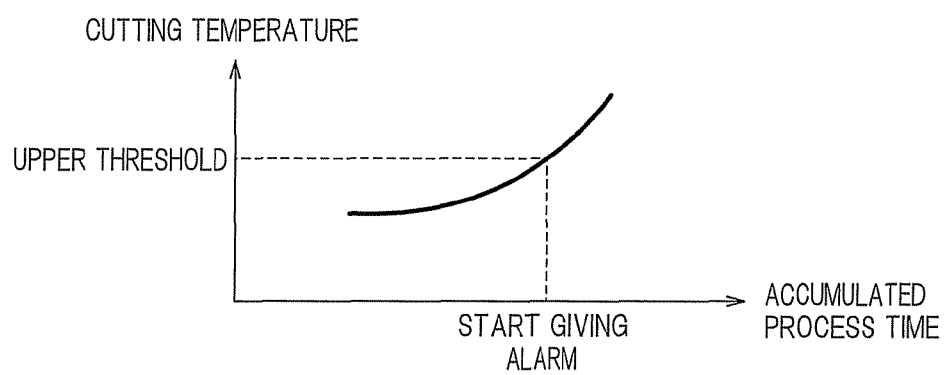
F I G. 4

METHOD OF MEASURING TEMPERATURE IN CUTTING PROCESS

CROSS REFERENCE TO RELATED APPLICATIONS

This application is based upon and claims the benefit of priority from the prior Japanese Patent Applications No. 2012-018322 filed on Jan. 31, 2012, No. 2012-084173 filed on Apr. 2, 2012, No. 2012-281471 filed on Dec. 25, 2012, and No. 2012-283254 filed on Dec. 26, 2012. The entire contents of the above applications are incorporated herein by reference.

FIELD OF THE INVENTION

The present invention relates to a method of measuring a temperature of a tool when a cutting process is carried out. In addition, the present invention relates to a method of optimizing conditions for a cutting process by measuring a temperature of a tool when a cutting process is carried out. Furthermore, the present invention relates to a method of judging when a tool of an apparatus for a cutting process should be replaced by measuring a temperature of a tool when a cutting process is carried out.

BACKGROUND ART

In general, when a cutting process is carried out, heat is generated by: (1) shearing deformation of a material to be cut, (2) friction on a cutting face, (3) friction on a flank, and so on. As a result, wear of a tool may be thermally generated, and/or surface quality of a material to be cut may be adversely affected.

On the other hand, when a temperature of the material to be cut is increased, cutting resistance is reduced, which is of benefit. In addition, built-up edge is also reduced, which is of benefit.

Therefore, in order to carry out a cutting process in an optimal way, it is important to recognize a temperature of a tool when the cutting process is carried out.

In particular, in recent years, in a technical field of ultra-precision cutting process, a tool made of single crystal diamond is used. However, the heat resistance of a tool made of single crystal diamond is about 600° C. at the highest. Therefore, it is necessary to monitor a temperature of the tool during a cutting process.

In addition, when a cutting process is carried out for a material such as a resin whose melting point is low, for example urethane, the cutting temperature has to be controlled within a proper low-temperature range (100° C. to 200° C.). However, if a cutting speed is restrained so as to restrain the cutting temperature, adhesion and/or built-up edge may be generated.

Therefore, when a tool made of single crystal diamond is used, and/or when a cutting process is carried out for a material such as a resin, it is important to recognize a temperature of a tool when the cutting process is carried out, in order to optimize conditions for the cutting process.

In order to recognize a temperature of a tool when the cutting process is carried out, conventionally, there is used (1) a method using a radiation thermometer, or (2) a method using the tool and the material to be cut as a thermocouple. For example, JP 2006-102864 A1 discloses a cutting test machine adopting the method (2).

FIG. 6 shows principle of temperature measurement according to the method (2). As seen from FIG. 6, a tool 52 and a material to be cut 53 form a thermocouple, so that a temperature of the tool 52 during the cutting process can be measured. Specifically, in the apparatus for a cutting process 50, the material to be cut 53 is connected to a voltage measuring unit 65 via a chuck 51, a mercury layer 54 and a lead wire 61. On the other hand, the tool 52 is also connected to the voltage measuring unit 65 via another lead wire 62. Accordingly, thermal electromotive force therebetween can be measured.

SUMMARY OF THE INVENTION

However, when a tool made of single crystal diamond is used, the method (2) cannot be adopted because the tool is an insulator. Similarly, when a cutting process is carried out for a material such as a resin, the method (2) cannot be adopted because the material to be cut is an insulator. On the other hand, the method (1) is not sufficient in view of precision of the temperature measurement.

The present invention was accomplished in light of the above problems in the conventional art. An object of the invention is therefore to provide a method of measuring a temperature of a tool with a high degree of accuracy when a cutting process is carried out, even when the tool is made of single crystal diamond and/or even when the cutting process is carried out for a material such as a resin. In addition, another object of the invention is to provide a method of optimizing conditions for a cutting process by measuring a temperature of a tool with a high degree of accuracy when a cutting process is carried out, even when the tool is made of single crystal diamond and/or even when the cutting process is carried out for a material such as a resin. Furthermore, a further object of the invention is to provide a method of judging when a tool of an apparatus for a cutting process should be replaced by measuring a temperature of a tool with a high degree of accuracy when a cutting process is carried out, even when the tool is made of single crystal diamond and/or even when the cutting process is carried out for a material such as a resin.

The present invention is a method of measuring a cutting temperature for an apparatus for a cutting process, the apparatus for a cutting process including a shank and a tool jointed to the shank by means of silver solder, the shank being electrically conductive, the tool being electrically nonconductive, the method comprising: connecting a first lead wire to the shank, connecting a second lead wire to the silver solder, and measuring thermal electromotive force that is generated between the first lead wire and the second lead wire.

According to the present invention, although the tool is electrically nonconductive, since the silver solder for fixing the tool is electrically conductive, the cutting temperature can be measured by measuring the thermal electromotive force that is generated between the silver solder and the electrically conductive shank. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Alternatively, the present invention is a method of measuring a cutting temperature for an apparatus for a cutting process, the apparatus for a cutting process including a shank and a tool jointed to the shank by means of silver solder, the tool being electrically nonconductive, the method comprising: connecting a first lead wire and a second lead wire to the silver solder, respectively, and measuring thermal electromotive force that is generated between the first lead wire and the second lead wire.

According to the present invention, although the tool is electrically nonconductive, since the silver solder for fixing the tool is electrically conductive, the cutting temperature can be measured by measuring the thermal electromotive force that is generated in the silver solder. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

In the above inventions, it is preferable that the method further comprises calculating a cutting temperature correspondingly based on the measured thermal electromotive force. In this case, it is easy to recognize the cutting temperature. For example, a conversion expression may be formulated with the use of another temperature measurement experiment or the like. The measured thermal electromotive force (voltage) can be converted to a cutting temperature by applying the conversion expression.

In particular, the present invention is effective when the tool is a tool made of single crystal diamond. The tool made of single crystal diamond has extremely high thermal conductivity, so that the temperature of the silver solder fixing the tool made of single crystal diamond can be considered to be the temperature of the tool made of single crystal diamond.

In addition, the shank is generally made of cemented carbide. More specifically, for example, the shank may be made of carbon tool steel.

In addition, the present invention is an apparatus for a cutting process that can immediately carry out the above measuring method. That is to say, the present invention is an apparatus for a cutting process comprising: a shank that is electrically conductive; a tool that is jointed to the shank by means of silver solder and is electrically nonconductive; a first lead wire connected to the shank; a second lead wire connected to the silver solder; and a voltage measuring unit connected to the first lead wire and the second lead wire, so as to measure thermal electromotive force that is generated between the first lead wire and the second lead wire. Alternatively, the present invention is an apparatus for a cutting process comprising: a shank; a tool that is jointed to the shank by means of silver solder and is electrically nonconductive; a first lead wire and a second lead wire connected to the silver solder, respectively; and a voltage measuring unit connected to the first lead wire and the second lead wire, so as to measure thermal electromotive force that is generated between the first lead wire and the second lead wire.

In this case, it is preferable that the apparatus for a cutting process further comprises a temperature-calculating unit configured to calculate a cutting temperature correspondingly based on the measured thermal electromotive force.

In addition, the present invention is a method of optimizing conditions for a cutting process by measuring a cutting temperature in an apparatus for the cutting process, the apparatus for the cutting process including a shank and a tool jointed to the shank by means of silver solder, the shank being electrically conductive, the tool being electrically nonconductive, the method comprising: connecting a first lead wire to the shank; connecting a second lead wire to the silver solder; measuring thermal electromotive force that is generated between the first lead wire and the second lead wire; calculating a cutting temperature correspondingly based on the measured thermal electromotive force; and reducing a cutting speed when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated between the silver solder and the electrically conductive shank. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by reducing a cutting speed when the measured (calculated) cutting temperature is higher than a predetermined upper threshold, optimization of the conditions for a cutting process can be efficiently achieved. Thus, it can be effectively prevented that the tool may be damaged by surpassing a heat-resistant temperature thereof and that the material to be cut whose melting point is low may melt.

Thus, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced.

Alternatively, the present invention is a method of optimizing conditions for a cutting process by measuring a cutting temperature in an apparatus for the cutting process, the apparatus for the cutting process including a shank and a tool jointed to the shank by means of silver solder, the tool being electrically nonconductive, the method comprising: connecting a first lead wire and a second lead wire to the silver solder, respectively; measuring thermal electromotive force that is generated between the first lead wire and the second lead wire; calculating a cutting temperature correspondingly based on the measured thermal electromotive force; and reducing a cutting speed when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated in the silver solder. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by reducing a cutting speed when the measured (calculated) cutting temperature is higher than a predetermined upper threshold, optimization of the conditions for a cutting process can be efficiently achieved. Thus, it can be effectively prevented that the tool may be damaged by surpassing a heat-resistant temperature thereof and that the material to be cut whose melting point is low may melt.

Thus, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced.

In calculating the cutting temperature correspondingly based on the measured thermal electromotive force, a conversion expression may be prepared with the use of another temperature measurement experiment or the like, and the measured thermal electromotive force (voltage) can be converted to a cutting temperature by applying the conversion expression.

In addition, it is effective that not only the upper threshold for a cutting temperature but also a lower threshold for a cutting temperature is used to optimize the conditions for a cutting process. That is to say, it is preferable that the method further comprises increasing the cutting speed when the calculated cutting temperature is lower than a predetermined lower threshold. In this case, the cutting speed is suitably increased, which is preferable for preventing adhesion and for improving process (machining) efficiency.

Alternatively, the present invention is a method of optimizing conditions for a cutting process by measuring a cutting temperature in an apparatus for the cutting process, the apparatus for the cutting process including a shank and a tool jointed to the shank by means of silver solder, the shank being electrically conductive, the tool being electrically nonconductive, the method comprising: connecting a first lead wire to the shank; connecting a second lead wire to the silver solder; measuring thermal electromotive force that is generated between the first lead wire and the second lead wire; calculating a cutting temperature correspondingly based on the measured thermal electromotive force; and reducing a depth of cut when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated between the silver solder and the electrically conductive shank. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by reducing a depth of cut when the measured (calculated) cutting temperature is higher than a predetermined upper threshold, optimization of the conditions for a cutting process can be efficiently achieved. Thus, it can be effectively prevented that the tool may be damaged by surpassing a heat-resistant temperature thereof and that the material to be cut whose melting point is low may melt.

Thus, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced.

Alternatively, the present invention is a method of optimizing conditions for a cutting process by measuring a cutting temperature in an apparatus for the cutting process, the apparatus for the cutting process including a shank and a tool jointed to the shank by means of silver solder, the tool being electrically nonconductive, the method comprising: connecting a first lead wire and a second lead wire to the silver solder, respectively; measuring thermal electromotive force that is generated between the first lead wire and the second lead wire; calculating a cutting temperature correspondingly based on the measured thermal electromotive force; and reducing a depth of cut when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated in the silver solder. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by reducing a depth of cut when the measured (calculated) cutting temperature is higher than a predetermined upper threshold, optimization of the conditions for a cutting process can be efficiently achieved. Thus, it can be effectively prevented that the tool may be damaged by surpassing a heat-resistant temperature thereof and that the material to be cut whose melting point is low may melt.

Thus, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced.

In calculating the cutting temperature correspondingly based on the measured thermal electromotive force, a conversion expression may be prepared with the use of another temperature measurement experiment or the like, and the measured thermal electromotive force (voltage) can be converted to a cutting temperature by applying the conversion expression.

In addition, it is effective that not only the upper threshold for a cutting temperature but also a lower threshold for a cutting temperature is used to optimize the conditions for a cutting process. That is to say, it is preferable that the method further comprises increasing the depth of cut when the calculated cutting temperature is lower than a predetermined lower threshold. In this case, the depth of cut is suitably increased, which is preferable for preventing adhesion and for improving process (machining) efficiency.

Alternatively, the present invention is a method of judging when a tool of an apparatus for a cutting process should be replaced by measuring a cutting temperature in the apparatus for a cutting process, the apparatus for a cutting process including a shank and a tool jointed to the shank by means of silver solder, the shank being electrically conductive, the tool being electrically nonconductive, the method comprising: connecting a first lead wire to the shank; connecting a second lead wire to the silver solder; measuring thermal electromotive force that is generated between the first lead wire and the second lead wire; calculating a cutting temperature correspondingly based on the measured thermal electromotive force; and judging that the time for replacement of the tool of the apparatus for a cutting process has already come when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated between the silver solder and the electrically conductive shank. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by judging that the time for replacement of the tool of the apparatus for a cutting process has already come when the measured (calculated) cutting temperature is higher than a predetermined upper threshold, it is possible to efficiently prompt replacement of the tool of the apparatus for a cutting process. This is based on the inventor's new view that the cutting temperature is slightly increased as wear of the tool is increased even under the same conditions for a cutting process. In order to judge that the time for replacement of the tool of the apparatus for a cutting process has already come, an absolute value of the measured cutting temperature or a change (rate of increase) of the measured cutting temperature may be used.

In addition, it is preferable that the method further comprises activating an alarm when it is judged that the time for replacement of the tool of the apparatus for a cutting process has already come.

Alternatively, the present invention is a method of judging when a tool of an apparatus for a cutting process should be replaced by measuring a cutting temperature in the apparatus for a cutting process, the apparatus for a cutting process including a shank and a tool jointed to the shank by means of silver solder, the tool being electrically nonconductive, the method comprising: connecting a first lead wire and a second lead wire to the silver solder, respectively; measuring thermal electromotive force that is generated between the first lead wire and the second lead wire, calculating a cutting temperature correspondingly based on the measured thermal electromotive force; and judging that the time for replacement of the tool of the apparatus for a cutting process has already come when the calculated cutting temperature is higher than a predetermined upper threshold.

According to the present invention, although the tool is electrically nonconductive, since the silver solder for fixing the tool is electrically conductive, the cutting temperature can be measured by measuring the thermal electromotive force that is generated in the silver solder. Thus, even when an insulation tool such as a tool made of single crystal diamond is used, the temperature of the tool during the cutting process can be measured with a high degree of accuracy. In addition, the present invention is applicable even when the cutting process is carried out for a material such as a resin because the material doesn't need to be electrically conductive.

Then, by judging that the time for replacement of the tool of the apparatus for a cutting process has already come when the measured (calculated) cutting temperature is higher than a predetermined upper threshold, it is possible to efficiently prompt replacement of the tool of the apparatus for a cutting process. This is based on the inventor's new view that the cutting temperature is slightly increased as wear of the tool is increased even under the same conditions for a cutting process. In order to judge that the time for replacement of the tool of the apparatus for a cutting process has already come, an absolute value of the measured cutting temperature or a change (rate of increase) of the measured cutting temperature may be used.

In addition, it is preferable that the method further comprises activating an alarm when it is judged that the time for replacement of the tool of the apparatus for a cutting process has already come.

In particular, the above respective inventions are effective when the tool is a tool made of single crystal diamond. The tool made of single crystal diamond has extremely high thermal conductivity, so that the temperature of the silver solder fixing the tool made of single crystal diamond can be considered to be the temperature of the tool made of single crystal diamond.

In addition, the shank that is electrically conductive is usually made of cemented carbide. More specifically, for example, the shank may be made of carbon tool steel.

BRIEF DESCRIPTION OF THE DRAWINGS

FIG. 1 is a schematic view of an apparatus for a cutting process according to an embodiment of the present invention;

FIG. 2 is a graph showing measurement results of thermal electromotive force over cutting process (machining) time;

FIG. 3 is a graph showing measurement results of thermal electromotive force over time, when urethane was cut under six patterns of conditions for a cutting process;

FIG. 4 is a graph showing measurement results of thermal electromotive force over accumulated process (machining) time;

DETAILED DESCRIPTION OF THE INVENTION

Figure 5:
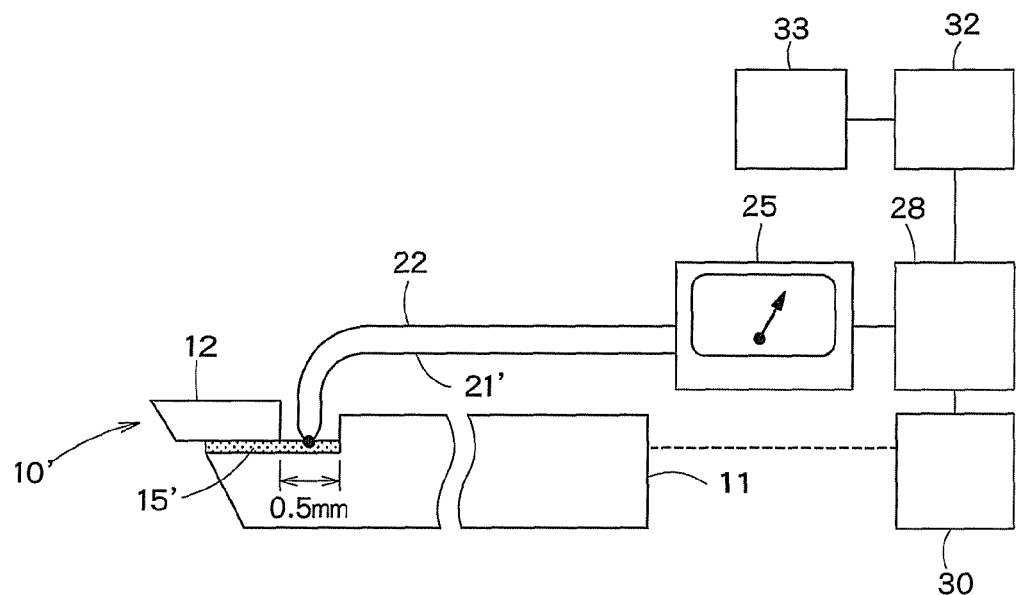
FIG. 5 is a schematic view of an apparatus for a cutting process according to another embodiment of the present invention.
Figure 6:
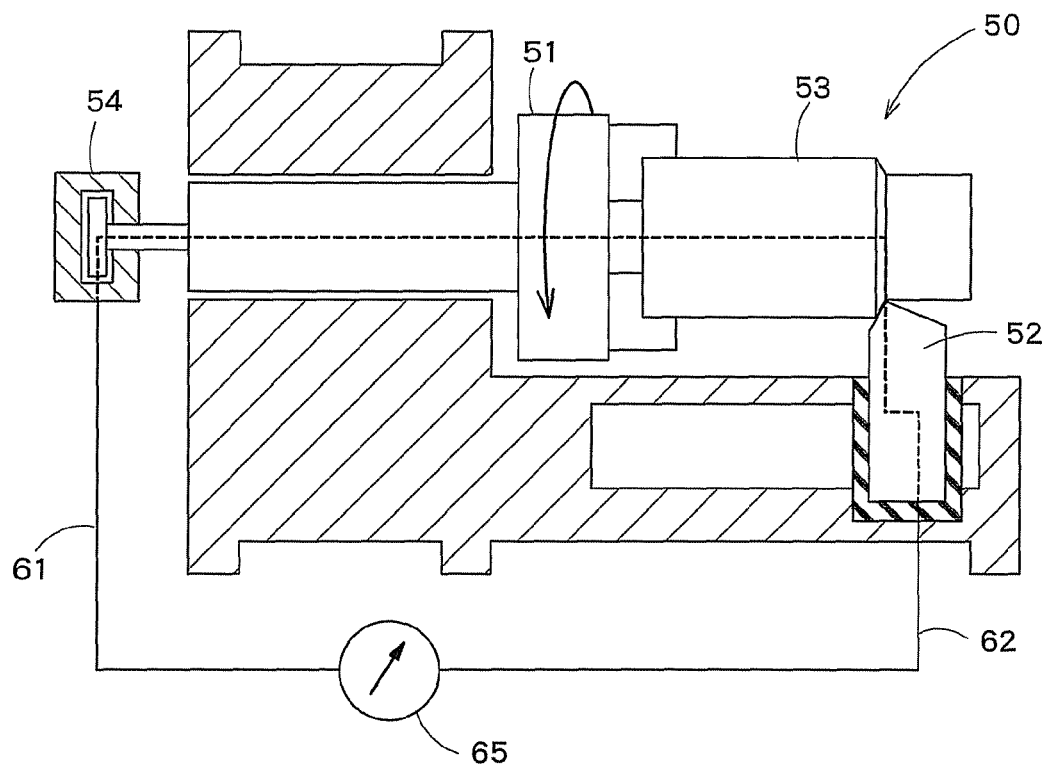
FIG. 6 is a view showing a conventional principle of a measurement of a tool temperature.

With reference to the accompanying drawings, embodiments of the present invention will be described hereinafter.

FIG. 1 is a schematic view of an apparatus for a cutting process according to an embodiment of the present invention. The apparatus for a cutting process 10 according to the present embodiment includes a shank 11 which is electrically conductive, and a tool 12 which is electrically nonconductive. The shank 11 and the tool 12 are fixed to each other by means of silver solder 15. A first lead wire 21 is connected to the shank 11, and a second lead wire 22 is connected to the silver solder 15. The first lead wire 21 and the second lead wire 22 are connected to a voltage measuring unit 25, which is configured to measure thermal electromotive force that is generated between the first lead wire 21 and the second lead wire 22. Furthermore, the apparatus for a cutting process 10 according to the present embodiment includes a calculating unit (temperature-calculating unit) 28 configured to calculate a cutting temperature correspondingly based on the measured thermal electromotive force, and a cutting-process-condition controlling unit 30 configured to change conditions for a cutting process based on the calculated cutting temperature.

In the present embodiment, as a tool having no electrical conductivity, a tool made of single crystal diamond 12 is used. The tool made of single crystal diamond 12 has extremely high thermal conductivity, so that the temperature of the silver solder 15 fixing the tool made of single crystal diamond 12 can be considered to be the temperature of the tool made of single crystal diamond 12. In addition, the shank 11 having electrical conductivity is made of carbon tool steel.

The measurement of the cutting temperature conducted in the present embodiment, that is, the measurement of the thermal electromotive force can be conducted continuously during the cutting process, or intermittently with suitable sampling intervals. FIG. 2 shows an example of measurement results in a case wherein the measurement was conducted continuously.

FIG. 2 shows measurement results of the thermal electromotive force when cutting processes were carried out to works made of oxygen-free copper under four different patterns of conditions for a cutting process (for example, under four different cutting speeds), with the use of a tool made of single crystal diamond having a tip radius of 0.5 R. The cutting temperatures corresponding to the respective conditions for a cutting process can be recognized as 25° C., 17° C., 15° C. and 8° C., by applying a conversion expression (for example, measured voltage×833 (° C./mV)) which has been formulated in advance with the use of another temperature measurement experiment or the like.

As described above, according to the present embodiment, although the tool made of single crystal diamond 12 is electrically nonconductive, since the silver solder 15 for fixing the tool made of single crystal diamond 12 is electrically conductive, the cutting temperature can be measured by measuring the thermal electromotive force that is generated between the silver solder 15 and the electrically conductive shank 11. Thus, the temperature of the tool 12 during the cutting process can be measured with a high degree of accuracy.

In addition, according to the present embodiment, the work (material to be cut) doesn't need to be electrically conductive. Thus, the present embodiment is applicable even when the cutting process is carried out for a material such as a resin. For example, FIG. 3 is a graph showing measurement results of thermal electromotive force over time, when urethane was cut under six patterns of conditions for a cutting process (in this case, under six different cutting speeds). In this case, the mutual ratio among the six cutting speeds was 1:0.89:0.78:0.67:0.56:0.44. The cutting temperatures corresponding to the respective conditions for a cutting process could be recognized as 240° C., 240° C., 220° C., 180° C., 160° C. and 150° C., by applying a conversion expression (for example, measured voltage×670 (° C./mV)) which has been formulated in advance with the use of another temperature measurement experiment or the like.

The melting point of Urethane is 200° C., and thus the cutting temperature for Urethane needs to be lower than 200° C. That is to say, the cutting conditions (1) to (3) are not adoptable. Furthermore, when the cutting speed was reduced more than the cutting condition (6), it was confirmed that adhesion was generated at the tip (cutting edge) and thus surface quality of the cut material was remarkably deteriorated. Therefore, it can be understood that the range of the cutting speed corresponding to the cutting conditions (4) to (6) is selectable.

Based on the above result, the cutting-process-condition controlling unit 30 of the present embodiment stores the range of 150° C. to 200° C. as a suitable cutting temperature for a cutting process for Urethane. Then, based on the measured (calculated) cutting temperature, the cutting-process-condition controlling unit 30 reduces the cutting speed when the measured cutting temperature is higher than 200° C., and increases the cutting speed when the measured cutting temperature is lower than 150° C.

Since the conditions for a cutting process (cutting speed) are controlled as described above, it can be effectively prevented that urethane (whose melting point is as low as 200° C.) melts and that the adhesion is caused.

Thus, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced. In fact, in the present embodiment, a standard tool shape (face angle: 0 degree, clearance angle: 5 to 7 degree) can be adopted.

Among the conditions for a cutting process, a depth of cut can be controlled in place of the cutting speed. For example, when the mutual ratio among six depths of cut is 1:0.89:0.78:0.67:0.56:0.44, substantially the same graph as the temperature measurement result of the six patterns shown in FIG. 3 can be obtained.

In this case too, the cutting temperature for Urethane needs to be lower than 200° C. Thus, the cutting conditions (1) to (3) are not adoptable. Furthermore, when the depth of cut is reduced more than the cutting condition (6), it is predictable that adhesion is generated at the tip (cutting edge) and thus surface quality of the cut material is remarkably deteriorated. Therefore, it can be understood that the range of the depth of cut corresponding to the cutting conditions (4) to (6) is selectable.

Based on the above result, the cutting-process-condition controlling unit 30 of the present embodiment may store the range of 150° C. to 200° C. as a suitable cutting temperature for a cutting process for Urethane. Then, based on the measured (calculated) cutting temperature, the cutting-process-condition controlling unit 30 may reduce the depth of cut when the measured cutting temperature is higher than 200° C., and may increase the depth of cut when the measured cutting temperature is lower than 150° C.

Since the conditions for a cutting process (depth of cut) are controlled as described above, it can be effectively prevented that urethane (whose melting point is as low as 200° C.) melts and that the adhesion is caused.

Thus, in this case too, it is not necessary to set a face angle to be positive and/or to set a clearance angle to be greater than a standard one, which would be necessary for a tip (cutting edge) of a conventional tool in order to achieve a low load cutting. Thus, the possibility of a sudden damage such as a tipping can be remarkably reduced. In fact, in the present embodiment, a standard tool shape (face angle: 0 degree, clearance angle: 5 to 7 degree) can be adopted.

Next, FIG. 4 is a graph showing measurement results of thermal electromotive force over accumulated process (machining) time. According to the inventor's new view, as shown in FIG. 4, the cutting temperature is slightly increased as wear of the tool is increased even under the same conditions for a cutting process. With the use of this phenomenon, through the measurement of the cutting temperature with a high degree of accuracy, progress status of the wear of the tool can be recognized.

Specifically, according to the present embodiment, a tool-replacement-time judging unit 32 is connected to the calculating unit (temperature-calculating unit) 28. The tool-replacement-time judging unit 32 is configured to judge that the time for replacement of the tool of the apparatus for a cutting process has already come when the cutting temperature is higher than a predetermined upper threshold, based on the cutting temperature calculated by the calculating unit (temperature-calculating unit) 28.

The judgment by the tool-replacement-time judging unit 32 may be conducted based on an absolute value of the cutting temperature measured by the calculating unit (temperature-calculating unit) 28 or based on a change (rate of increase) of the cutting temperature measured by the calculating unit (temperature-calculating unit) 28.

In addition, in the present embodiment, an alarm unit 33 is connected to the tool-replacement-time judging unit 32, and the alarm unit 33 is configured to give an alarm when the tool-replacement-time judging unit 32 judges that the time for replacement of the tool has already come.

According to the above embodiment, it is possible to appropriately and efficiently prompt replacement of the tool of the apparatus for a cutting process, based on the cutting temperature measured (calculated) with a high degree of accuracy.

Herein, according to the present embodiment, the cutting temperature is measured under the actual conditions for a cutting process. Therefore, the cutting temperature can be measured with a high degree of accuracy for each kind of cutting process (cutting, milling, drilling, and so on), and for each shape of tool (R-shape, angled-shape, linear-shape such as a cutting-off tool, and so on).

In addition, according to the above embodiment, the apparatus for a cutting process 10 is provided with the first lead wire 21, the second lead wire 22, the voltage measuring unit 25, the calculating unit 28, the cutting-process-condition controlling unit 30, the tool-replacement-time judging unit 32, and the alarm unit 33 in advance. However, the present invention is not limited to this manner. The present invention is applicable to any existing apparatus for a cutting process: having a shank that is electrically conductive, and a tool that is jointed to the shank by means of silver solder and is electrically nonconductive. In this case, in order to form a thermocouple between the shank and the silver solder, there are necessary: connecting a first lead wire to the shank; and connecting a second lead wire to the silver solder; and connecting both the first lead wire and the second lead wire to a voltage measuring unit for measuring thermal electromotive force therebetween.

Next, with referent to FIG. 5, an apparatus for a cutting process according to another embodiment of the present invention is explained. FIG. 5 is a schematic view of an apparatus for a cutting process according to another embodiment of the present invention. In the apparatus for a cutting process 10' of this embodiment, a first lead wire 21' and a second lead wire 22' form a thermocouple consisting of different kinds of metal material and are connected to silver solder 15' respectively.

Herein, in order to securely connect the silver solder 15' to the first lead wire 21' and the second lead wire 22', the length of the silver solder 15' for a gap between the shank 11 and the tool 12 shown in FIG. 5 is 0.5 mm or longer (while the length of the silver solder 15 for the corresponding gap in the embodiment shown in FIG. 1 may be as short as 0.1 mm).

The other structure of the present embodiment is the same as the previous embodiment shown in FIG. 1. In FIG. 5, the same element as that in the previous embodiment shown in FIG. 1 is shown with the same numeral sign, and explanation thereof is omitted.

According to the present embodiment, the same effects as the previous embodiment can be obtained. In addition, the present embodiment is applicable when the shank is electrically nonconductive.

The invention claimed is:

1. A method of measuring a cutting temperature for an apparatus for a cutting process, the apparatus for a cutting process including a shank and a tool jointed to the shank by means of silver solder, the shank being electrically conductive, the tool being electrically nonconductive, and the tool being configured to cut a work while the tool is jointed to the shank, the method comprising
    directly connecting a first lead wire to the shank,
    directly connecting a second lead wire to the silver solder, and
    measuring thermal electromotive force that is generated between the first lead wire and the second lead wire, wherein
    the measured thermal electromotive force provides an indication of the cutting temperature.

2. The method of measuring a cutting temperature according to claim 1, wherein the tool being electrically nonconductive is a tool made of single crystal diamond.

3. The method of measuring a cutting temperature according to claim 1, further comprising, the shank is made of cemented carbide.

4. A method of measuring a cutting temperature for an apparatus for a cutting process, the apparatus for a cutting process including a shank and a tool jointed to the shank by means of silver solder, the tool being electrically nonconductive, and the tool being configured to cut a work while the tool is jointed to the shank, the method comprising
    directly connecting a first lead wire and a second lead wire to the silver solder, respectively, and
    measuring thermal electromotive force that is generated between the first lead wire and the second lead wire, wherein
    the measured thermal electromotive force provides an indication of the cutting temperature.

5. An apparatus for a cutting process comprising
    a shank that is electrically conductive,
    a tool that is jointed to the shank by means of silver solder and is electrically nonconductive, and the tool being configured to cut a work while the tool is jointed to the shank,
    a first lead wire directly connected to the shank,
    a second lead wire directly connected to the silver solder, and
    a voltage measuring unit connected to the first lead wire and the second lead wire, so as and configured to measure thermal electromotive force that is generated between the first lead wire and the second lead wire, wherein
    the measured thermal electromotive force provides an indication of the cutting temperature.

6. The apparatus for a cutting process according to claim 5, further comprising a temperature-calculating unit configured to calculate a cutting temperature correspondingly based on the measured thermal electromotive force by using a preformulated conversion expression.

7. The apparatus for a cutting process according to claim 5, wherein the tool being electrically nonconductive is a tool made of comprises a single crystal diamond.

8. The apparatus for a cutting process according to claim 5, wherein the shank is made of cemented carbide.

9. An apparatus for a cutting process comprising
    a shank,
    a tool that is jointed to the shank by means of silver solder and is electrically nonconductive, and the tool being configured to cut a work while the tool is jointed to the shank, a first lead wire and a second lead wire directly connected to the silver solder, respectively, and a voltage measuring unit connected to the first lead wire and the second lead wire, so as and configured to measure thermal electromotive force that is generated between the first lead wire and the second lead wire, wherein the measured thermal electromotive force provides an indication of the cutting temperature.

* * * * *